United States Patent [19]
Blaszczynski

[11] Patent Number: 5,343,059
[45] Date of Patent: Aug. 30, 1994

[54] METHOD AND APPARATUS FOR REDUCING BLOOMING IN OUTPUT OF A CCD IMAGE SENSOR

[75] Inventor: George M. Blaszczynski, Arlington, Mass.

[73] Assignee: Leaf Systems, Inc., Southboro, Mass.

[21] Appl. No.: 38,470

[22] Filed: Mar. 30, 1993

[51] Int. Cl.$^5$ .............................................. H01L 27/14
[52] U.S. Cl. .................................. 257/223; 257/229; 257/230; 307/311; 348/250; 348/251; 348/313
[58] Field of Search ....................... 257/230, 229, 223; 307/311; 358/213.18, 213.15, 213.24, 213.19, 213.31

[56] References Cited

U.S. PATENT DOCUMENTS

| | | | |
|---|---|---|---|
| 4,302,779 | 11/1981 | Inoue | 257/229 X |
| 4,328,432 | 5/1982 | Yamazaki | 257/230 X |
| 4,679,212 | 7/1987 | Hynecek | 257/230 X |
| 4,694,476 | 9/1987 | Oda | 257/230 X |
| 5,122,850 | 6/1992 | Burkey | 357/24 |

FOREIGN PATENT DOCUMENTS

61-219271 9/1986 Japan .................... 257/223

OTHER PUBLICATIONS

Heyns et al., "The Resistive Gate CTD Area-Image Sensor;" *IEEE Transactions on Electron Devices*, vol. ED-25, No. 2, Feb. 1978, pp. 135-139.

Furukawa et al., "An Interline Transfer CCD For A Single Sensor ⅔ Color Comera," Conference: International Electron Devices Meeting Technical Digest, Washington, D.C., U.S.A., Dec. 8-10, 1980 pp. 346-349.

"Electronic Components and Circuits", NASA's Jet Propulsion Laboratory, Pasadena, California, NASA Tech Briefs, Jul. 1992, pp. 20, 22, 28.

*Primary Examiner*—William Mintel
*Attorney, Agent, or Firm*—Gottlieb, Rackman & Reisman

[57] ABSTRACT

A method and apparatus for reducing bloom in an output of a charge coupled device (CCD) image sensor is disclosed. The method includes the step of toggling at least two phases of said CCD after exposure of said CCD. The method and apparatus are particularly useful when a flash of light occurs during the exposure.

3 Claims, 1 Drawing Sheet

METHOD AND APPARATUS FOR REDUCING BLOOMING IN OUTPUT OF A CCD IMAGE SENSOR

FIELD OF THE INVENTION

The present invention relates to apparatus and methods for operating charge coupled device (CCD) image sensors generally and to methods of implementing anti-blooming in particular.

BACKGROUND OF THE INVENTION

As is known in the art, the image sensors smear bright spots, in a process known as "blooming". The excessive illumination at the bright spots causes a local excessive generation of image charge in a few elements of the CCD image sensor. The excessive generation often spreads to neighboring, less illuminated and less charged CCD elements, which spreading of charge results in blooming.

In the past, blooming was reduced by changing the structure of the CCD elements. One such structure is described in detail in U.S. Pat. No. 5,122,850 to Burkey. However, these structures are complicated, costly and reduce quantum efficiency.

A method of anti-blooming has been developed which involves toggling the phases of the CCD image sensor during exposure. It is briefly described in the article "Preventing Blooming in CCD Images", *NASA Tech Briefs*, July 1992, pp. 20–21. The disclosure of that article is incorporated herein by reference. This anti-blooming method does not produce acceptable results with a flash exposure.

SUMMARY OF THE INVENTION

It is an object of the present invention to provide an improved method of anti-blooming.

There is therefore provided, in accordance with .a preferred embodiment of the present invention, a method for reducing bloom in output of a charge coupled device (CCD) image sensor including the step of toggling at least two phases of the CCD after exposure of the CCD.

Additionally, in accordance with a preferred embodiment of the present invention, a flash of light occurs during the exposure.

Moreover, in accordance with a preferred embodiment of the present invention, the step of toggling continues until an amount of charge stored in each element of the CCD is at a desired level.

Further, in accordance with a preferred embodiment of the present invention, the method includes the step of reading out data stored in the CCD after the step of toggling has concluded, wherein the step of reading out is performed in accordance with a desired read-out mode and wherein the desired level is generally close to the full well level associated with the read-out mode. The read-out mode can be the multi-phased pinned (MPP) mode or, alternatively, the buried channel mode.

Still further, in accordance with a preferred embodiment of the present invention, the step of toggling is performed with first high and low voltages, the step of reading charge out is performed with second high and low voltages and the first high voltage may be different from the second high voltage.

Additionally, in accordance with a preferred embodiment of the present invention, the step of toggling is performed with high and low voltages and wherein the desired level is affected by changing the high voltage.

Moreover, in accordance with a preferred embodiment of the present invention, the step of reading charge out of the CCD image sensor in accordance with a desired read-out mode and wherein the desired level is generally close to the full well level associated with the read-out mode.

Further, in accordance with a preferred embodiment of the present invention, the step of toggling at least two phases of the CCD during exposure.

Finally, there is also provided, in accordance with another preferred embodiment of the present invention, apparatus for reducing bloom in output of a CCD image sensor including a CCD toggler for toggling at least two phases of the CCD after exposure of the CCD. The apparatus performs the steps of the method described hereinabove.

BRIEF DESCRIPTION OF THE DRAWINGS

The present invention will be understood and appreciated more fully from the following detailed description taken in conjunction with the drawings in which.

DETAILED DESCRIPTION OF PRESENT INVENTION

Figure 1:
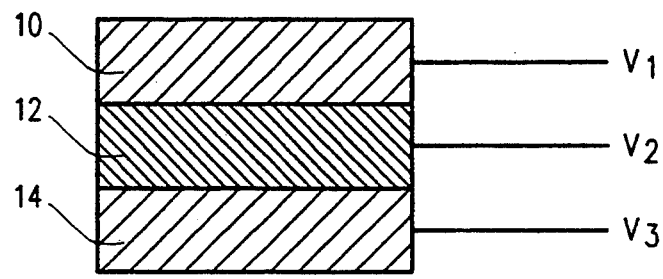
FIG. 1 is a schematic illustration of one element of a CCD array.
Figure 2:
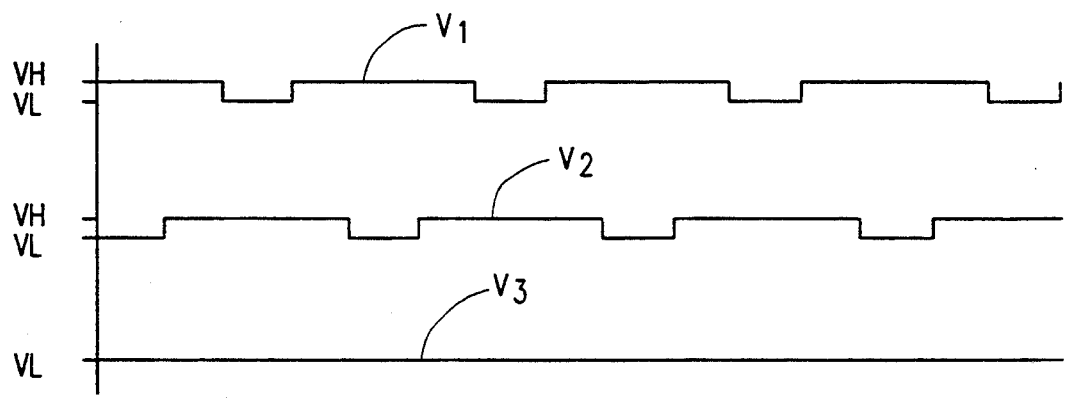
FIG. 2 is a graphical illustration of the amount of charge stored in the CCD element of FIG. 1 during a data cycle.
Figure 3:
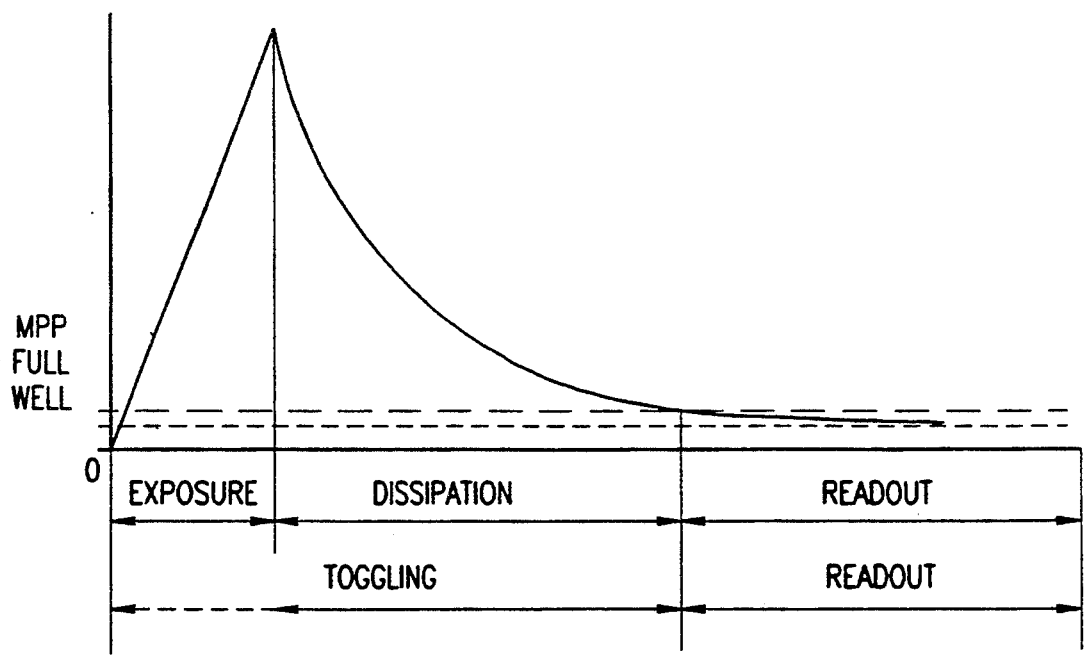
FIG. 3 is a timing diagram illustration for toggling of the phases of the CCD element of FIG. 1, in accordance with a preferred embodiment of the present invention.

Reference is now made to FIGS. 1–3 which are useful in understanding the anti-blooming method of the present invention.

FIG. 1 illustrates one element of a CCD image sensor array, such as the CCD 442 manufactured by Loral Fairchild Imaging Sensors, Milipitas, Calif., U.S.A.. The element typically has three phases 10–14 formed by three gate structures. Each phase 10–14 is separately controlled by a corresponding signal, V1, V2 or V3, as shown in FIG. 1.

During exposure, charge is generated in the CCD image sensor. As mentioned hereinabove, in areas of high intensity, excess charge may be generated which will cause blooming if not somehow reduced. Prior art anti-blooming systems operate to reduce blooming during exposure.

However, during flash exposures, the charge accumulates over a short period of time and prior art anti-blooming techniques based on toggling of phases are not effective.

FIG. 2 graphs the charge level during and after a flash exposure for areas exposed to excessive brightness. It is noted that the flash produces in the CCD elements a charge level Q significantly in excess of a buried channel full well charge level, yet this charge generally does not bloom. Significant blooming would occur if this charge were to be shifted as is necessary during read-out.

It has been experimentally discovered by the Applicant that toggling in accordance with the article, "Preventing Blooming in CCD Images", does not remove enough of the excessive charge, especially for flash exposures.

It has further been experimentally discovered that continued toggling after exposure is useful and effects continued reduction of the charge level. If the toggling is continued for a long enough period of time, the charge will be reduced to the level of the buried channel full well.

Therefore, in accordance with the present invention, the signals V1 and V2 are toggled after the flash exposure, during a "dissipation" period, as noted in FIG. 2. The signals can optionally also be toggled during exposure. The exact shape of the charge accumulation and dissipation curve is currently undetermined and thus, the curve given in FIG. 2 is an approximation only.

Typical timing diagrams for the signals V1–V3 during toggling are shown in FIG. 3. It is noted that signals V1 and V2 vary between high and low voltage levels, VH and VL, and that, generally, V1 is high when V2 is low and vice versa. V3 is typically kept at the VL voltage level. The VH and VL for the three different phases may all be different.

In some applications, as is the case with flash exposures, the exposure interval is much shorter than the read-out interval and it may be desirable to operate the CCD image sensor in the multi-phased pinned (MPP) mode during image read-out. For these applications, to prevent blooming, the charge must be dissipated to the level of the MPP full well before the MPP readout begins. This can be done by increasing the high voltage VH during the dissipation period. Typically, VH is set to the level which results in the buried channel full well being approximately equal to the MPP full well. For example, for the CCD 442, VH of +9V prevents blooming with MPP read-out.

It will be appreciated that increasing the high voltage VH decreases the size of the buried channel full well.

The length of the dissipation period is typically experimentally determined by overexposing the CCD image sensor with a constant, predetermined amount of light, typically during a flash exposure, and toggling for a variable length of time after the exposure. The length of time which ensures that the charge remaining after toggling does not bloom is the desired length of the dissipation period.

It will be appreciated by persons skilled in the art that the present invention is not limited to what has been particularly shown and described hereinabove. Rather the scope of the present invention is defined only by the claims which follow:

I claim:

1. A method for reducing bloom in an output of a charge coupled device (CCD) image sensor comprising the step of:
   toggling at least two phases of said CCD after exposure of said CCD until an amount of charge stored in each element of said CCD is at a desired level,
   reading out data stored in said CCD after said step of toggling has concluded, wherein said step of reading out is performed in accordance with a desired read-out mode and wherein said desired level is generally close to a full well level associated with said read-out mode,
   wherein said read-out mode is the multi-phased pinned (MPP) mode, and
   wherein said step of toggling is performed with first high and low voltages, said step of reading charge out is performed with second high and low voltages and said first high voltage is different from said second high voltage.

2. An apparatus for reducing bloom in an output of a CCD image sensor comprising:
   a CCD toggler for toggling at least two phases of said CCD after exposure of said CCD,
   wherein said CCD toggler operates until an amount of charge stored in each element of said CCD is at a desired level, and
   wherein said read-out mode is a multi-phased pinned (MPP) mode, and
   wherein said CCD toggler toggles between first high and low voltages, said read-out circuit operates with second high and low voltages and said first high voltage is different from said second high voltage.

3. An apparatus according to claim 2 including said read-out circuit for reading out data stored in said CCD image sensor in accordance with said desired read-out mode and wherein said desired level is generally close to a full well level associated with said read-out mode.

* * * * *